(12) United States Patent
Kirk

(10) Patent No.: US 6,181,272 B1
(45) Date of Patent: Jan. 30, 2001

(54) DATA COMMUNICATIONS NETWORK

(75) Inventor: Dan M. Kirk, Scottsdale, AZ (US)

(73) Assignee: Motorola, Inc., Schaumburg, IL (US)

( * ) Notice: Under 35 U.S.C. 154(b), the term of this patent shall be extended for 0 days.

(21) Appl. No.: 09/363,810

(22) Filed: Jul. 30, 1999

(51) Int. Cl.[7] .............................. G01S 13/78; G01S 13/79
(52) U.S. Cl. ................................ 342/45; 342/50; 342/56; 342/57; 342/58; 342/357.06; 342/357.09
(58) Field of Search ................................ 342/45, 50, 54, 342/56, 57, 58, 60, 357.06, 357.07, 357.09, 357.1, 357.12, 450, 451, 453, 457, 463

(56) References Cited

U.S. PATENT DOCUMENTS

| | | | |
|---|---|---|---|
| 5,141,308 | * | 8/1992 | Danckwerth et al. .................... 356/5 |
| 5,280,287 | * | 1/1994 | Evans ...................................... 342/45 |
| 5,317,442 | * | 5/1994 | Sharp et al. .......................... 359/170 |
| 5,396,243 | * | 3/1995 | Jalink, Jr. et al. ...................... 342/54 |
| 5,519,403 | * | 5/1996 | Bickley et al. ....................... 342/352 |
| 5,742,251 | * | 4/1998 | Gerber ................................... 342/45 |
| 5,745,575 | * | 4/1998 | Otto et al. .............................. 380/23 |
| 6,072,994 | * | 6/2000 | Phillips et al. .......................... 455/84 |

* cited by examiner

Primary Examiner—John B. Sotomayor
(74) Attorney, Agent, or Firm—Frank J. Bogacz

(57) ABSTRACT

A method (200, 300) and apparatus (100) provides for displaying locally the position and identity of various field operatives or agents who have radio receiver transmitters (20, 30 and 40). A local control station (10) transmits a request for identification to radios (20, 30 and 40). Each radio responds back with a message (226) giving its location. The local control station then displays the identity and location of the unit on an area map (234) and stores the information in memory (236). Control station 10 further designates some or all of the radios (20, 30 and 40) with a laser designator signal (60). The radio then responds with an IFF signal (318) if it is a friendly agent.

17 Claims, 3 Drawing Sheets

DATA COMMUNICATIONS NETWORK

BACKGROUND OF THE INVENTION

The present invention pertains to data communication networks and more particularly to laser and RF data communication networks.

For many modern day situations such as police, fire and military, for example, knowledge of the location of nearby associates is helpful in improving the delivery of such services. Also, identifying related associates is of critical importance in providing utility services, emergency services or in military applications. In the delivery of today's utility services, emergency services, police services and in military situations, improved situational awareness of all operatives in the field is of critical importance. When a number of related operatives are in the field and are attempting to act as a cohesive unit, location of each of the associates or operatives and the ability to command them is of critical importance. Whether a person is an associate or member of the team or not also is important, particularly in military situation.

Accordingly, what is needed is an apparatus and method for a data communications network which identifies cooperatives in the field and provides information to a local command center for analysis and deployment of associates or operatives as a cohesive unit.

DESCRIPTION OF THE PREFERRED EMBODIMENT

Figure 1:
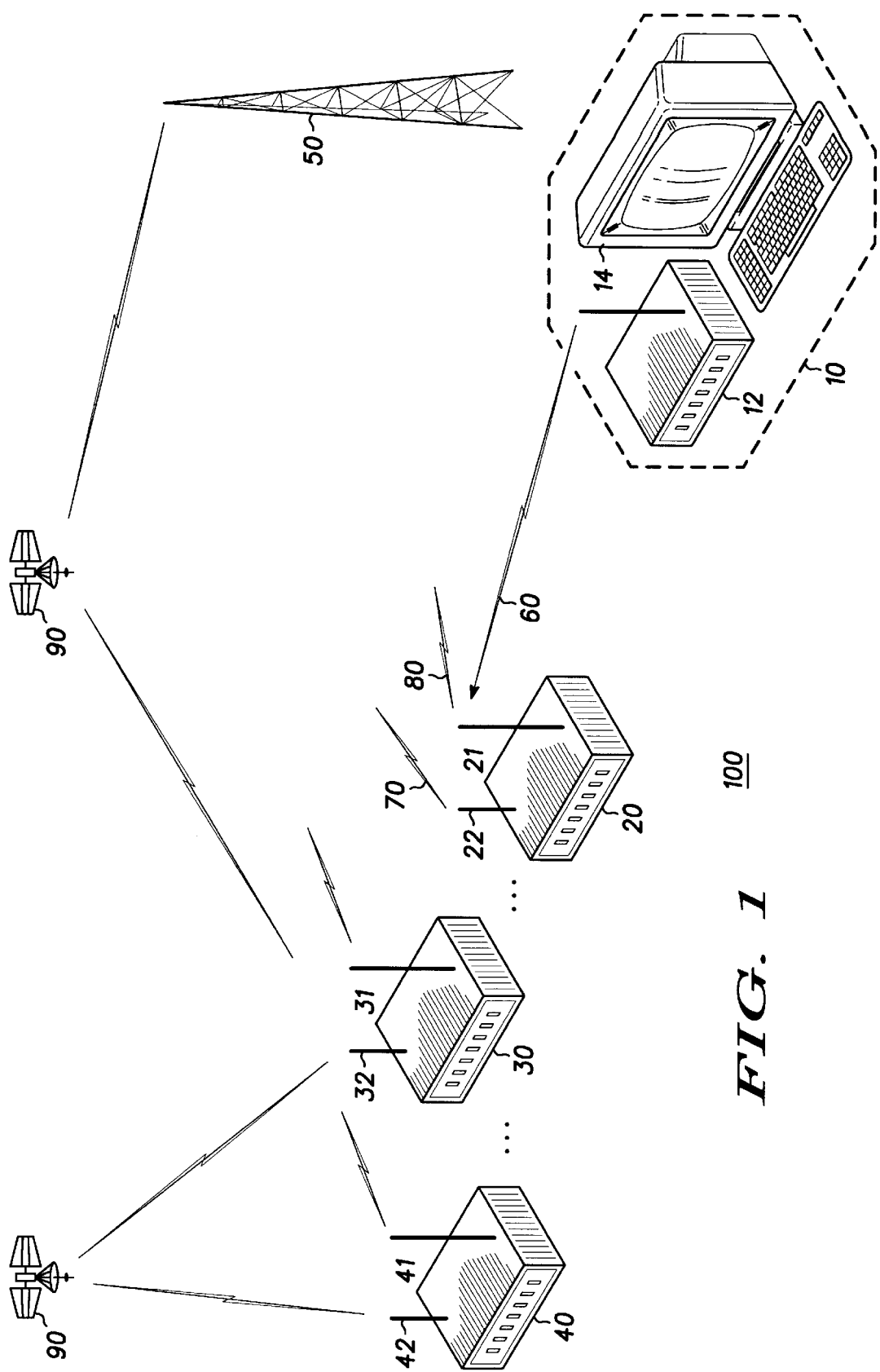
FIG. 1 is a block diagram of a data communication and identification network in accordance with the present invention.

FIG. 1 depicts a data communications network. The data communications network allows a command station 10 to monitor the location and identity of various local field associates or operatives. Local command station 10 includes a laser designator/radio receiver transmitter 12. Additionally, local command station 10 includes a computer 14 with display screen. Computer 14 displays the location of the operatives associated with the particular situation. For example, field operatives have radio receiver/transmitter (20–40) may be fire fighters deployed at various locations of a fire; police deployed at a particular crime scene; emergency services deployed in a field; or soldiers deployed in a field operation in a particular locale.

Laser designator/radio 12 and computer 14 may comprise an individual unit or separate units as shown. The radio units (20–40) are each attached to a field operative or soldier, for example. These radios may be relatively small, hand-held or pack-mountable radios. Radios (20–40) must also have a laser beam detector (not shown) associated with them.

Antenna 50 which may be coupled to local command station 10 or to a central command station (not shown), transmits code word updates to each of the field operatives' radios (20–40). This scenario is particularly useful where the operatives are soldiers and enemy soldiers are trying to intercept messages and transmissions or to spoof the transmissions of enemy soldiers. This antenna may be a permanently mounted structure for military training fields. Antenna 50 may be a portable device rapidly and easily deployed upon a permanent battlefield or for police or fire operations in an area. The code word, which forms a portion of the transmissions back and forth between the local command station 10 and field operatives' radios (20–40), may be updated quite frequently for military operations. The code words may be updated for the military applications every minute or five minutes, for example. The code word may be updated relatively infrequently for police or fire operations, such as once per day. Code words may be preprogrammed into each of the radios (20–40) of the field operatives on a daily basis or a weekly basis. Thereby, the need for antenna 50 as a fixture in the field would be eliminated. Antenna 50, with the code word update transmissions, provides a level of security for those particular operations which may require high security such as military or less frequent, such as police or fire.

The area for the communication network embodied in the present invention is approximately one kilometer. This is an optimal distance since the remote radios (20–40) of the field operatives must sustain operation from batteries while remaining relatively small and portable and perhaps hand-held. As battery technology improves, greater distances of field operations may be able to be achieved with the same communications network. The one-kilometer area is by way of example and certain terrains may lend themselves to more distant operation than the one kilometer area. GPS (Global Positioning System) satellites 90 provide location information to each of the field operatives' radios (20–40). Each of the radios (20–40) of the field operatives includes a GPS receiver for receiving GPS satellite signals and decoding the location of the receiver and field agent.

The present communications network 100 in its preferred embodiment is a digital data network in which digital data is transmitted back and forth between local command station 10 and the field operatives' radios (20–40). Digital data provides the added feature of being relatively easy to encode or encrypt to prevent interception by an enemy, for example.

Periodically, each of the field operatives' radios (20–40) transmits their position to the local command station 10. This may be done on a fixed time basis or upon request of the local command. For military applications, data transmissions are to be kept to a minimum so as to avoid enemy interception or spoofing. Therefore, such positional reporting by the field operatives' radios (20–40) may be done on an infrequent or a-periodic basis. A request for position may be transmitted by local command station 10 to each of the field operatives' radios (20–40). This request will be encrypted with the most recently established code word. Operatives' radios (20–40) receive the updated code word from transmissions via antenna 50. Operatives' radios (20–40) then obtain and determine their position from the transmissions of GPS satellites 90. These positions are encrypted with the most recently obtained code word. Each operative's radio (20–40) then transmits its position information in digital form via antennas 22, 32 or 42 and transmission 70 to local command station 10.

Radio 12 of control station 10 receives the position information and determines that the proper encryption with the code word has been performed. When the transmission is verified as being one of the proper field operatives' radios (20–40) computer 14 then displays a topographical map with the location and identity of the particular field operative. In this way, local command station 10 is always aware of the most current position of each of its field operatives and any attempt to spoof the system is minimized by the use of the code words and encryption.

Figure 2:
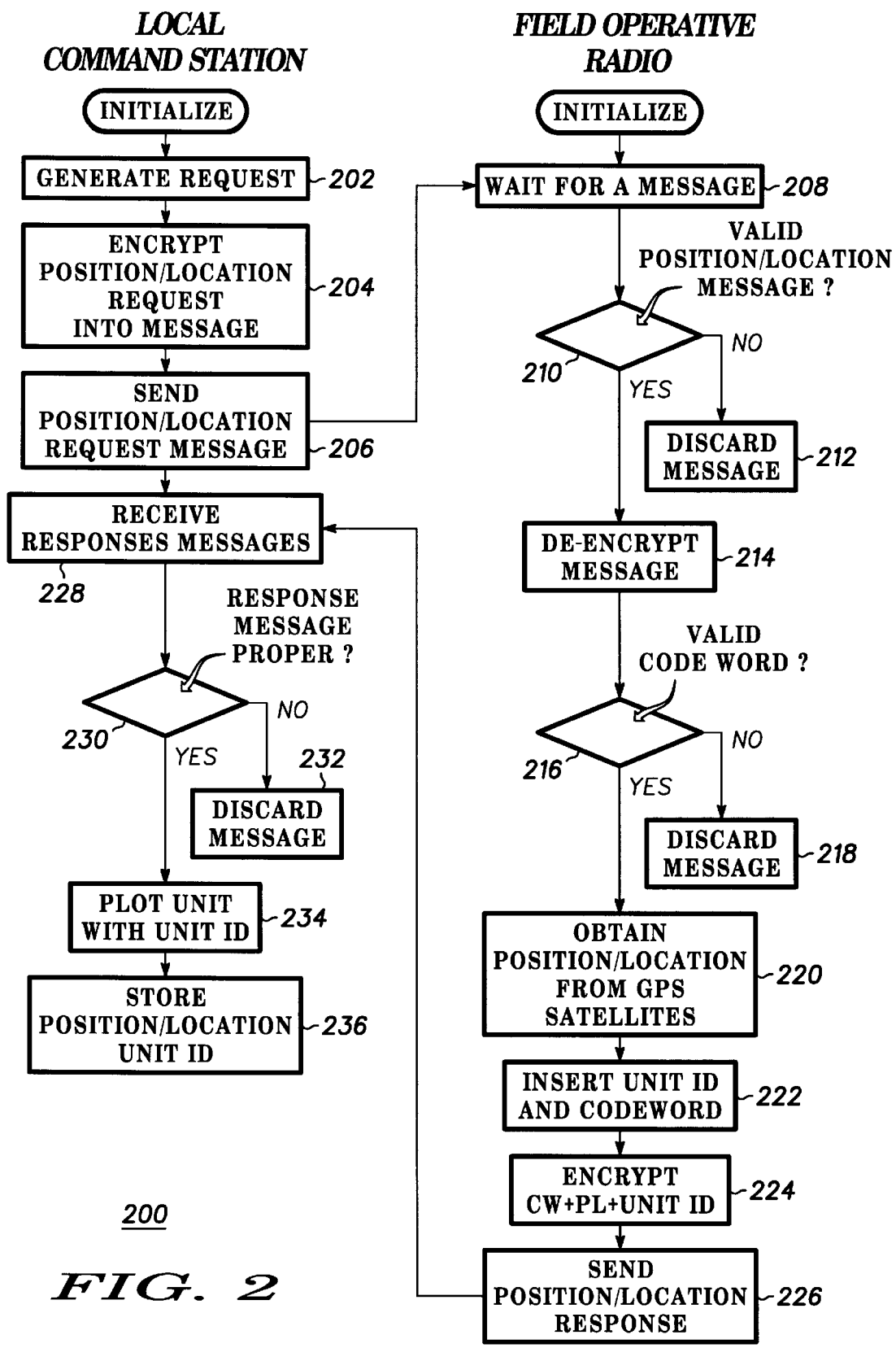
FIG. 2 is a flow diagram of local command interrogation of field associates or operatives in accordance with the present invention.

Referring to FIG. 2, a flow diagram of position location determination process 200 by the local command station is shown. Both the local command station and field operatives' radios (20–40) are initialized. The local command station generates a request for position location information of each operative, block 202. The position location request is encrypted into a message, block 204. The local command station then sends the position location request message to the field operatives' radio, block 206.

Each of the field operatives' radios (20–40) receives the position location request message. Each of the radios has been waiting for a message, block 208. When the message is received, block 210 determines whether the position location request message was valid. If not, the message is discarded, block 212. If the request message is valid, block 214 decrypts the message. Next, block 216 determines whether the code word is valid. If the code word was invalid, block 218 discards the message.

If the code word is valid, block 220 obtains the position location information from the GPS satellite system. Then, block 222 inserts the unit identification and code word into a response message. Block 224 then encrypts the response message including the code word, position location information and unit identification. Block 226 sends or transmits the position location response message back to the local command station 10.

The local command station 10 then receives the response messages from each of the field operatives. Block 230 determines whether the response message is proper. That is, it decrypts the message and examines the code word received from the field operative's radio (20–40). If the message is not proper, block 232 is entered and the message is discarded. If the response is proper, the location of the field operative is plotted or depicted on the display screen of computer 14 with the unit identification, block 234. Lastly, the position location information is stored according to the unit identification, block 236.

Figure 3:
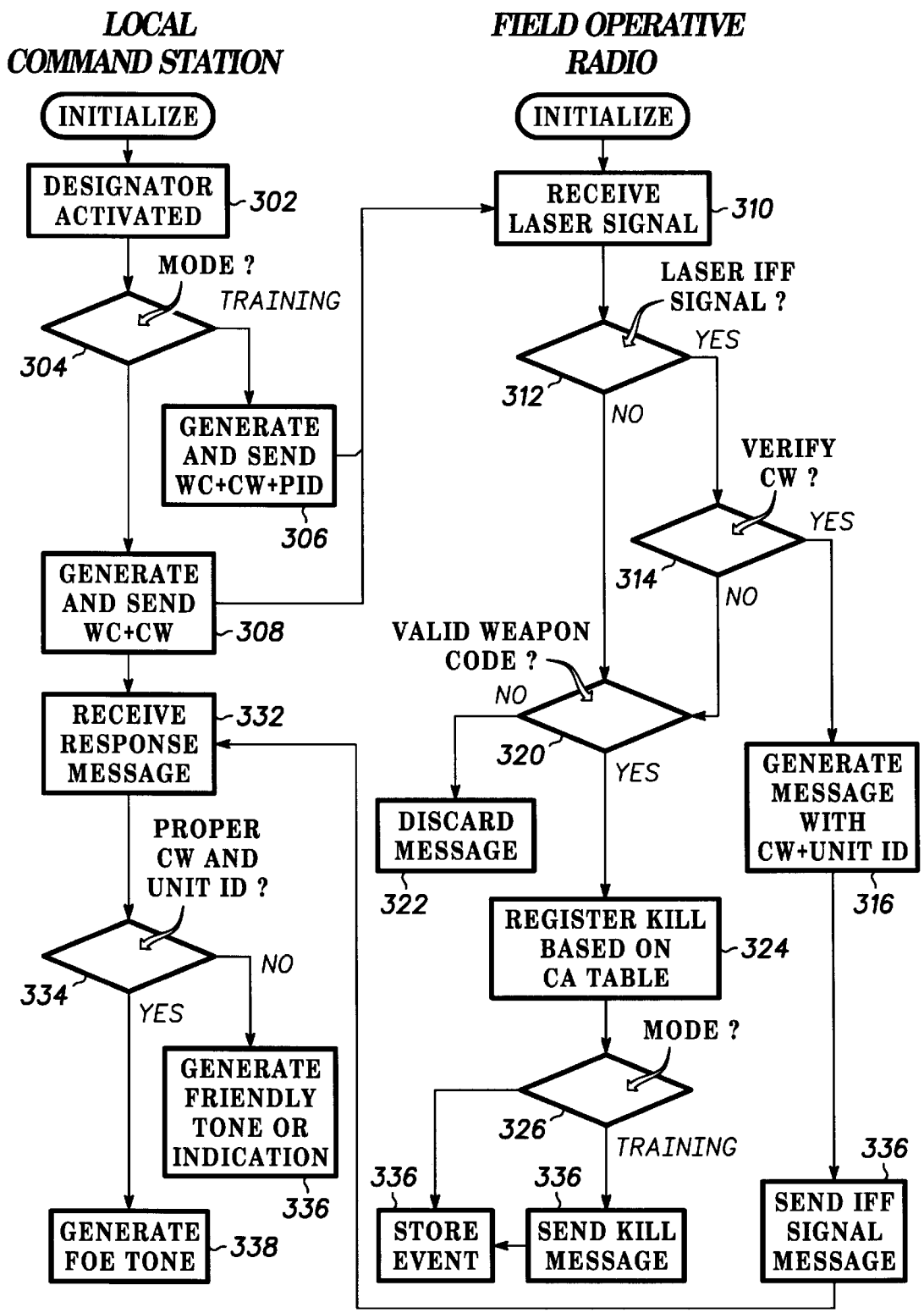
FIG. 3 is a flow diagram of a local command station's identity process of field associates or operatives in accordance with the present invention.

Referring to FIG. 3, a flow diagram of an identification friend or foe (IFF) operation 300 of the communications network 100 of the present invention is shown. As an example, a battlefield scenario will be used as an example. Options for an actual battlefield or a training exercise battlefield are included, for example.

Both the local command station 10 and field operatives' radios (20–40) are initialized. Local command station 10 activates a laser designator to designate a particular field operative's radio such as operatives' radio 20. Next, the command station 10 determines what mode is to be employed for this identification friend or foe process. If a training mode is employed, block 306 is entered. Block 306 generates and sends a message including a weapons code which is specific to the battlefield examples, actual mode or training mode, a code word and a player identification. If an actual battlefield scenario is being employed, block 308 is entered. Block 308 generates and sends a message including a weapon code and code word.

Field operative's radio 20 receives a laser designation signal. Laser detectors may be mounted on the radio itself or upon the particular operative such as on a helmet or a vest that is worn during the battlefield training exercises.

Operative 20 receives the laser designation signal, block 310. Block 312 determines whether the signal is a laser IFF signal. If it is, block 314 is entered. Block 314 verifies whether the code word is proper. If the code word is proper, block 314 transfers control to block 316. Block 316 generates a message with the code word and unit identification. Next, block 318 sends an IFF signal message from radio 20 to the local command station 10 via a RF (radio frequency) signal 80.

Block 332 then receives the response message. Next, block 334 determines whether the code word and unit ID are proper. If the code word and unit ID (identity) are proper, a friendly soldier has responded to the IFF request. Block 336 then generates a friendly tone or indication for transmission back to the field operative's radio 20. If the code word or unit ID were not proper, block 338 generates a full tone indicating that the responding unit was an enemy unit attempting to spoof the system.

If the signal received by field operative 20, for example, is not a laser IFF signal or if the code word cannot be verified by block 314, block 320 is given control. The following part of the flow diagram pertains to battlefield simulation (war game) activity and determines the results of the laser designation of an enemy or foe. Block 320 determines whether the hit code is valid. If the hit code is valid, block 322 discards the message and takes no further action. If the hit code is valid, block 324 registers the kill based upon a casualty assessment table. Then, block 326 checks the mode. For the training mode, a kill message is sent to the local command station, block 328. Then, the event of a kill is stored in a local memory. If the mode was not a training mode, the event is simply stored.

It will be observed from the above explanation that a data communications system has been shown which provides for a combination of laser designation along with digital data RF communications. This system provides the advantages of a local command station which may assess particular situation (fire, police or military) and determine where each of the field operatives are located and how to direct them to effectively bring about a successful resolution of the situation.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An apparatus for providing location information in a data communications network comprising:

at least one radio;

a control station for wireless communication with said at least one radio;

means for transmitting position information to said at least one radio;

said means for transmitting position information comprises a global positioning system (GPS);

said at least one radio for determining a location of said at least one radio using said means for transmitting position information and for transmitting said location, a code and a radio identity to said control station;

said control station for graphically displaying said location and said radio identity;

said control station including a laser designator for communicating with said at least one radio; and said at least one radio responsive to said laser designator to transmit an IFF (identification friend or foe) response message to said control station.

2. An apparatus as claimed in claim 1, wherein said at least one radio comprises a plurality of radios for communicating with said control station.

3. An apparatus as claimed in claim 2, wherein each of said plurality of radios includes means for receiving said position information.

4. An apparatus as claimed in claim 2, wherein there is further included means for receiving said position information.

5. An apparatus as claimed in claim 2, wherein there is further included means for transmitting said code to each said plurality of radios.

6. An apparatus as claimed in claim 5, wherein each of said plurality of radios includes means for transmitting a message including said position information and said code to said control station.

7. An apparatus as claimed in claim 6, wherein said control station includes means for receiving said position information and said code from said plurality of radios.

8. An apparatus as claimed in claim 7, wherein said control station further includes means for decoding said position information and the code.

9. An apparatus as claimed in claim 8, wherein the control station further includes a display screen for displaying said position information and said radio identity of each of said plurality of radios.

10. A method for communicating location and identification of field agents comprises the step of:
   wirelessly sending a location request message from a control station to at least one radio associated with a field agent;
   receiving said location request message by said at least one radio;
   determining a location by using a GPS system of said at least one radio by said at least one radio;
   sending a location response message to said control station by said at least one radio, said location response message including said location, a code and an identity of said at least one radio;
   display on a display screen said location and said identity of said at least one radio;
   indicating by the control station that a responding radio is a proper radio if said code and radio identity are proper;
   designating with a laser said at least one radio; and
   sending an identification friend or foe response message by said at least one radio to said control station.

11. A method for communicating location and identification as claimed in claim 10, wherein there is further included the step of determining by said at least one radio whether said location request message is valid.

12. A method for communicating location and identification as claimed in claim 11, wherein the step of determining whether said location request message is valid includes the step of:
   determining whether said location request message includes said code word; and
   decrypting said location request message.

13. A method for communicating the location and identification as claimed in claim 11, wherein there is further included the step of determining whether the code word and identity of said at least one radio is proper by said control station.

14. A method for communicating location identity as claimed in claim 13, wherein there in further included a step of storing said location and said identity of said at least one radio by said control station.

15. A method for communicating location and identification as claimed in claim 10 wherein said step of designating with a laser includes the steps of:
   receiving by said at least one radio a laser signal; and
   determining by said at least one radio whether said laser signal is an identification friend or foe signal.

16. A method for communicating location and identification as claimed in claim 15, wherein there is further included a step of sending an identification friend or foe response message to said control station, if said received laser signal is a laser identification friend or foe signal.

17. A method for communicating location and identification as claimed in claim 16, wherein there is further included a step of determining whether said code and radio identity transmitted in response to said received laser signal are proper.

\* \* \* \* \*